US009577266B2

(12) United States Patent
Troxel et al.

(10) Patent No.: US 9,577,266 B2
(45) Date of Patent: Feb. 21, 2017

(54) NEGATIVE GRID FOR BATTERY

(75) Inventors: Jeffrey L. Troxel, Menomonee Falls, WI (US); Charles J. Schaeffer, Wauwatosa, WI (US); Glenn W. Andersen, Hartford, WI (US); Michael E. Lacroix, Mequon, WI (US); Wen-Hong Kao, Brown Deer, WI (US)

(73) Assignee: Johnson Controls Technology Company, Plymouth, MI (US)

( * ) Notice: Subject to any disclaimer, the term of this patent is extended or adjusted under 35 U.S.C. 154(b) by 801 days.

(21) Appl. No.: 12/529,599

(22) PCT Filed: Feb. 29, 2008

(86) PCT No.: PCT/US2008/055481
§ 371 (c)(1),
(2), (4) Date: Dec. 8, 2009

(87) PCT Pub. No.: WO2008/109429
PCT Pub. Date: Sep. 12, 2008

(65) Prior Publication Data
US 2010/0101078 A1 Apr. 29, 2010

Related U.S. Application Data

(60) Provisional application No. 60/904,404, filed on Mar. 2, 2007.

(51) Int. Cl.
*H01M 2/00* (2006.01)
*H01M 4/68* (2006.01)
(Continued)

(52) U.S. Cl.
CPC ............ *H01M 4/685* (2013.01); *H01M 4/667* (2013.01); *H01M 4/73* (2013.01); *Y10T 29/49108* (2015.01)

(58) Field of Classification Search
CPC .......... H01M 2/00; H01M 4/00; H01M 14/00; H01M 16/00; H01M 4/72; H01M 4/74
(Continued)

(56) References Cited

U.S. PATENT DOCUMENTS 345,511 A 7/1886 Khotinsky
487,834 A 12/1892 Griscom
(Continued)

FOREIGN PATENT DOCUMENTS

CN 1279824 A 1/2001
CN 1515043 A 7/2004
(Continued)

OTHER PUBLICATIONS

Patent Abstract for AU 275685.
(Continued)

*Primary Examiner* — Daniel Gatewood
(74) *Attorney, Agent, or Firm* — Broadman & Clark LLP

(57) ABSTRACT

A method for producing a negative grid for a battery which includes providing a strip of battery grid material and performing a punching operation on the battery grid material to remove material and form a grid. The punching operation produces a negative battery grid having a plurality of grid wires bounded by a frame. The battery grid includes a top frame member. A first side frame member is coupled to the top frame member at a first end thereof. A second side frame member is coupled to the top frame member at a second end thereof. A bottom frame member is spaced apart from the top frame member and coupled to the first side frame member and the second side frame member. The negative grid does not include exposed wire ends that may puncture a polymeric separator when the negative grid is provided within the separator.

31 Claims, 5 Drawing Sheets

(51) Int. Cl.
*H01M 4/66* (2006.01)
*H01M 4/73* (2006.01)

(58) Field of Classification Search
USPC .................. 29/623.1; 429/209, 233, 241
See application file for complete search history.

(56) References Cited

U.S. PATENT DOCUMENTS

| | | | |
|---|---|---|---|
| 669,085 A | 3/1901 | Heidel | |
| 1,129,690 A | 2/1915 | Knobloch | |
| 1,347,873 A | 7/1920 | Rabe | |
| 1,364,760 A | 1/1921 | Holland | |
| 1,381,008 A | 6/1921 | Polk | |
| 1,500,219 A | 7/1924 | Benner | |
| 1,524,610 A | 1/1925 | Ahlgren | |
| 1,528,963 A | 3/1925 | Adams et al. | |
| 1,600,083 A | 9/1926 | Webster | |
| 1,675,644 A | 7/1928 | Reginald et al. | |
| 1,947,473 A | 2/1934 | Huebner | |
| 1,983,611 A | 12/1934 | Jackson | |
| 2,060,534 A | 11/1936 | Singleton et al. | |
| 2,073,727 A | 5/1937 | Wirtz | |
| 2,148,371 A | 2/1939 | Galloway | |
| 2,193,782 A | 3/1940 | Smith | |
| 2,261,053 A | 10/1941 | De Martis et al. | |
| 2,282,760 A | 5/1942 | Hauel | |
| 2,882,760 A | 5/1942 | Haud | |
| 2,503,907 A | 4/1950 | Rupp | |
| 2,727,079 A | 12/1955 | Chubb et al. | |
| 2,821,565 A | 1/1958 | Lander et al. | |
| 2,881,105 A | 4/1959 | Gullett | |
| 2,882,568 A | 4/1959 | Leaberry et al. | |
| 3,009,459 A | 11/1961 | Ruben | |
| 3,023,468 A | 3/1962 | Hord et al. | |
| 3,249,981 A | 5/1966 | Sabatino | |
| 3,349,067 A | 10/1967 | Hill et al. | |
| 3,398,024 A | 8/1968 | Barnes et al. | |
| 3,408,236 A | 10/1968 | Hartesveldt | |
| 3,453,145 A | 7/1969 | Duddy | |
| 3,466,193 A | 9/1969 | Hughel | |
| 3,486,942 A | 12/1969 | Hatterschide | |
| 3,534,803 A | 10/1970 | Bickerdike et al. | |
| 3,556,853 A | 1/1971 | Cannone | |
| 3,556,854 A | 1/1971 | Wheadon et al. | |
| 3,579,386 A | 5/1971 | Tiegel et al. | |
| 3,629,388 A | 12/1971 | Wolf et al. | |
| 3,710,430 A | 1/1973 | Long et al. | |
| 3,723,181 A | 3/1973 | Oakley | |
| 3,761,047 A | 9/1973 | Mao | |
| 3,779,816 A | 12/1973 | Mao | |
| 3,853,626 A | 12/1974 | Daniels et al. | |
| 3,909,293 A | 9/1975 | Hammond et al. | |
| 3,923,545 A | 12/1975 | Marguiles et al. | |
| 3,926,247 A | 12/1975 | Geiger | |
| 3,929,513 A | 12/1975 | Mao | |
| 3,933,335 A | 1/1976 | Maruyama et al. | |
| 3,933,524 A | 1/1976 | Hughel et al. | |
| 3,945,097 A | 3/1976 | Daniels, Jr. et al. | |
| 3,947,936 A | 4/1976 | Wheadon | |
| 3,959,016 A | 5/1976 | Tsuda | |
| 3,989,539 A | 11/1976 | Grabb | |
| 4,016,633 A | 4/1977 | Smith et al. | |
| 4,022,951 A | 5/1977 | McDowall | |
| 4,048,397 A | 9/1977 | Rothbauer | |
| 4,050,502 A | 9/1977 | Allyn et al. | |
| 4,080,727 A | 3/1978 | Stolle et al. | |
| 4,097,625 A | 6/1978 | Lunn et al. | |
| 4,107,407 A | 8/1978 | Koch | |
| 4,118,553 A | 10/1978 | Buckethal et al. | |
| 4,140,840 A | 2/1979 | Ruben | |
| 4,151,331 A | 4/1979 | Hug et al. | |
| 4,159,908 A | 7/1979 | Rao et al. | |
| 4,189,533 A | 2/1980 | Sugalski | |
| 4,193,769 A | 3/1980 | Feagin | |
| 4,196,757 A | 4/1980 | Hug et al. | |
| 4,199,849 A | 4/1980 | Moreau | |
| 4,221,032 A | 9/1980 | Cousino et al. | |
| 4,221,852 A | 9/1980 | Qureshi | |
| 4,291,443 A | 9/1981 | Laurie et al. | |
| 4,297,866 A | 11/1981 | Sakauye et al. | |
| 4,303,747 A | 12/1981 | Bender | |
| 4,305,187 A | 12/1981 | Iwamura et al. | |
| 4,315,356 A | 2/1982 | Laurie et al. | |
| 4,315,829 A | 2/1982 | Duddy et al. | |
| 4,317,351 A | 3/1982 | Borrows | |
| 4,320,183 A | 3/1982 | Qureshi | |
| 4,327,163 A | 4/1982 | Wheadon | |
| 4,345,452 A | 8/1982 | Eberle | |
| 4,349,067 A | 9/1982 | Wirtz et al. | |
| 4,351,891 A | 9/1982 | McCartney, Jr. et al. | |
| 4,353,969 A | 10/1982 | Rippel et al. | |
| 4,358,892 A | 11/1982 | Turillon et al. | |
| 4,386,987 A | 6/1983 | Covitch et al. | |
| 4,407,063 A | 10/1983 | Johnson | |
| 4,443,918 A | 4/1984 | Morinari et al. | |
| 4,455,724 A | 6/1984 | Sperling et al. | |
| 4,460,666 A | 7/1984 | Dinkler et al. | |
| 4,462,745 A | 7/1984 | Johnson et al. | |
| 4,477,546 A | 10/1984 | Wheeler et al. | |
| 4,498,519 A | 2/1985 | Watanabe et al. | |
| 4,528,255 A | 7/1985 | Hayes et al. | |
| 4,548,882 A | 10/1985 | Shima et al. | |
| 4,555,459 A | 11/1985 | Anderson et al. | |
| 4,606,383 A | 8/1986 | Yanik | |
| 4,614,630 A | 9/1986 | Pluim, Jr. | |
| 4,629,516 A | 12/1986 | Myers | |
| 4,683,180 A | 7/1987 | Bish et al. | |
| 4,758,126 A | 7/1988 | Johnson et al. | |
| 4,761,352 A | 8/1988 | Bakos et al. | |
| 4,761,356 A | 8/1988 | Kobayashi et al. | |
| 4,782,585 A | 11/1988 | Kobayashi et al. | |
| 4,805,277 A | 2/1989 | Yasuda et al. | |
| 4,822,234 A | 4/1989 | Johnson et al. | |
| 4,824,307 A | 4/1989 | Johnson et al. | |
| 4,830,938 A | 5/1989 | McCullough et al. | |
| 4,865,928 A | 9/1989 | Richter | |
| 4,865,933 A | 9/1989 | Blanyer et al. | |
| 4,882,234 A | 11/1989 | Lai et al. | |
| 4,882,828 A | 11/1989 | McLoughlin et al. | |
| 4,906,540 A | 3/1990 | Hoshihara et al. | |
| 4,932,443 A * | 6/1990 | Karolek et al. ............. 141/1.1 | |
| 4,939,051 A | 7/1990 | Yasuda et al. | |
| 4,982,482 A | 1/1991 | Wheadon et al. | |
| 5,017,446 A | 5/1991 | Reichman et al. | |
| 5,024,908 A | 6/1991 | Terada et al. | |
| 5,093,970 A | 3/1992 | Senoo et al. | |
| 5,098,799 A | 3/1992 | Bowen et al. | |
| 5,149,605 A | 9/1992 | Dougherty | |
| 5,221,852 A | 6/1993 | Nagai et al. | |
| 5,223,354 A | 6/1993 | Senoo et al. | |
| 5,264,306 A | 11/1993 | Walker, Jr. et al. | |
| 5,273,554 A | 12/1993 | Vyas | |
| 5,308,719 A | 5/1994 | Mrotek et al. | |
| 5,344,727 A | 9/1994 | Meadows et al. | |
| 5,350,645 A | 9/1994 | Lake et al. | |
| 5,384,217 A | 1/1995 | Binder et al. | |
| 5,384,219 A | 1/1995 | Dao et al. | |
| 5,434,025 A | 7/1995 | Rao et al. | |
| 5,462,109 A | 10/1995 | Vincze | |
| 5,506,062 A | 4/1996 | Flammang | |
| 5,540,127 A | 7/1996 | Binder et al. | |
| 5,543,250 A | 8/1996 | Yanagihara et al. | |
| 5,578,398 A | 11/1996 | Jenkins et al. | |
| 5,578,840 A | 11/1996 | Scepanovic et al. | |
| 5,580,685 A | 12/1996 | Schenk | |
| 5,582,936 A | 12/1996 | Mrotek et al. | |
| 5,595,840 A | 1/1997 | Hanning et al. | |
| 5,601,953 A * | 2/1997 | Schenk ..................... 429/241 | |
| 5,611,128 A | 3/1997 | Wirtz | |
| 5,643,696 A | 7/1997 | Rowlette | |
| 5,660,600 A | 8/1997 | Vyas | |
| 5,660,946 A | 8/1997 | Kump et al. | |
| 5,691,087 A | 11/1997 | Rao et al. | |
| 5,851,695 A | 12/1998 | Misra et al. | |

(56) References Cited

U.S. PATENT DOCUMENTS

| | | |
|---|---|---|
| 5,858,575 A | 1/1999 | Chen |
| 5,874,186 A | 2/1999 | Rao et al. |
| 5,948,566 A | 9/1999 | Larsen et al. |
| 5,952,123 A | 9/1999 | Hatanaka et al. |
| 5,958,625 A | 9/1999 | Rao |
| 5,989,749 A | 11/1999 | Kao |
| 6,026,722 A | 2/2000 | Lopez Ascaso et al. |
| 6,037,081 A | 3/2000 | Kashio et al. |
| 6,057,059 A | 5/2000 | Kwok et al. |
| RE36,734 E | 6/2000 | Binder et al. |
| 6,086,691 A | 7/2000 | Lehockey et al. |
| 6,117,594 A | 9/2000 | Taylor et al. |
| 6,122,820 A | 9/2000 | Dawood et al. |
| 6,180,286 B1 | 1/2001 | Rao et al. |
| 6,203,948 B1 | 3/2001 | Kao et al. |
| 6,245,462 B1 | 6/2001 | Kao et al. |
| 6,267,923 B1 | 7/2001 | Albert et al. |
| 6,274,274 B1 | 8/2001 | Schaeffer et al. |
| 6,291,097 B1 | 9/2001 | Barker et al. |
| 6,291,104 B1 | 9/2001 | Yoshihara et al. |
| 6,312,852 B1 | 11/2001 | Wagner |
| 6,342,110 B1 | 1/2002 | Palumbo |
| 6,348,283 B1 | 2/2002 | Mas et al. |
| 6,351,878 B1 | 3/2002 | Rao |
| 6,419,712 B1 | 7/2002 | Haverstick |
| 6,442,811 B1 | 9/2002 | Dawood et al. |
| 6,444,366 B1 | 9/2002 | Kawano et al. |
| 6,454,977 B1 | 9/2002 | Kwok et al. |
| 6,468,318 B1 | 10/2002 | Meadows et al. |
| 6,582,855 B1 | 6/2003 | Miyamoto et al. |
| 6,592,686 B2 | 7/2003 | Palumbo |
| 6,649,306 B2 | 11/2003 | Prengaman |
| 6,749,950 B2 | 6/2004 | Zhang |
| 6,755,874 B2 | 6/2004 | Chen et al. |
| 6,797,403 B2 | 9/2004 | Clark et al. |
| 6,833,218 B2 | 12/2004 | Mann |
| 6,921,611 B2 | 7/2005 | Schaeffer et al. |
| 6,953,641 B2 | 10/2005 | Chen |
| 7,398,581 B2 | 7/2008 | Chen |
| 7,799,463 B2 | 9/2010 | Schaeffer et al. |
| 8,034,488 B2 | 10/2011 | Schaeffer et al. |
| 2002/0015891 A1 | 2/2002 | Schaeffer et al. |
| 2002/0088515 A1 | 7/2002 | Aust et al. |
| 2003/0059674 A1 | 3/2003 | Mann et al. |
| 2003/0096170 A1* | 5/2003 | Fujiwara ............ H01M 4/745 429/242 |
| 2004/0033157 A1 | 2/2004 | Schaeffer |
| 2004/0038129 A1* | 2/2004 | Mann ........................ 429/233 |
| 2004/0187986 A1* | 9/2004 | Schaeffer ..................... 148/706 |
| 2005/0112470 A1 | 5/2005 | Taylor et al. |
| 2005/0150092 A1 | 7/2005 | Chen |
| 2005/0164091 A1* | 7/2005 | Schaeffer et al. ............ 429/241 |
| 2006/0096079 A1* | 5/2006 | Farina .................. B21D 13/04 29/564 |
| 2008/0289161 A1 | 11/2008 | Chen |
| 2012/0047719 A1 | 3/2012 | Schaeffer |
| 2012/0058394 A1 | 3/2012 | Schaeffer |

FOREIGN PATENT DOCUMENTS

| | | |
|---|---|---|
| CN | 1833896 A | 9/2006 |
| CN | 101233635 A | 7/2008 |
| CN | 201514971 U | 6/2010 |
| CN | 201741750 U | 2/2011 |
| DE | 2528688 | 1/1977 |
| DE | 3045683 | 6/1982 |
| EP | 0029788 | 11/1980 |
| EP | 0065996 | 5/1981 |
| EP | 0348702 | 1/1990 |
| EP | 0589549 | 3/1994 |
| EP | 0795917 A2 | 9/1997 |
| EP | 0969108 | 1/2000 |
| EP | 1041164 | 10/2000 |
| GB | 570953 | 7/1945 |
| GB | 1377039 | 5/1973 |
| GB | 1 376 162 A | 12/1974 |
| GB | 2127614 A | 7/1983 |
| GB | 2170343 | 7/1986 |
| JP | 56-110578 | 1/1955 |
| JP | 58-155660 | 9/1958 |
| JP | 55046267 | 3/1980 |
| JP | 55130076 | 10/1980 |
| JP | 55144659 | 11/1980 |
| JP | 56032678 | 4/1981 |
| JP | 56107474 | 8/1981 |
| JP | 56138871 | 10/1981 |
| JP | 56138872 | 10/1981 |
| JP | 56165279 | 12/1981 |
| JP | 56167271 | 12/1981 |
| JP | 57205969 | 12/1982 |
| JP | 58032367 | 2/1983 |
| JP | 58066266 | 4/1983 |
| JP | 58075772 | 5/1983 |
| JP | 59134563 | 8/1984 |
| JP | 60000062 | 1/1985 |
| JP | 60009061 | 1/1985 |
| JP | 60037663 | 2/1985 |
| JP | 60039766 | 3/1985 |
| JP | 60-78570 | 5/1985 |
| JP | 60143570 | 7/1985 |
| JP | 60150556 | 8/1985 |
| JP | 60167267 | 8/1985 |
| JP | 60167268 | 8/1985 |
| JP | 60198055 | 10/1985 |
| JP | 61124052 | 6/1986 |
| JP | 63213264 | 9/1988 |
| JP | 1030168 | 2/1989 |
| JP | 2297864 | 12/1990 |
| JP | 3030260 | 2/1991 |
| JP | 3245462 | 11/1991 |
| JP | 5036416 | 2/1993 |
| JP | 5275081 | 10/1993 |
| JP | 07065822 | 3/1995 |
| JP | 8083617 | 3/1996 |
| JP | 8287905 | 11/1996 |
| JP | 09-231995 | 9/1997 |
| JP | 10284085 | 10/1998 |
| JP | 11054115 | 2/1999 |
| JP | 11213993 | 8/1999 |
| JP | 2001229920 | 8/2001 |
| JP | 2001-524736 | 12/2001 |
| JP | 2002-260716 | 9/2002 |
| JP | 2004-521445 | 7/2004 |
| WO | WO 9927595 | 6/1999 |
| WO | WO 01/4978 A1 | 1/2001 |
| WO | WO 0104977 | 1/2001 |
| WO | WO 0153549 | 7/2001 |
| WO | WO 0215296 | 2/2002 |
| WO | WO 02054513 A2 | 7/2002 |
| WO | WO 2006127575 | 11/2006 |
| WO | WO 2006127575 A1 * | 11/2006 |
| WO | WO 2008/109429 A2 | 9/2008 |
| WO | WO 2009/150485 A1 | 12/2009 |

OTHER PUBLICATIONS

Patent Abstract for JP 10-284085; publication dated Oct. 23, 1998.
PCT Search Report dated Oct. 9, 2000 for PCT/US00/18144.
International Search Report dated Aug. 19, 2002 for PCT/US02/00390, 7 pages.
Office Action dated May 1, 2003 for U.S. Appl. No. 09/898,660.
Office Action dated Mar. 24, 2003 for U.S. Appl. No. 09/898,660.
U.S. Appl. No. 09/898,660 titled "Modifiction of the Shape/Surface Finish of Battery Grid Wires to Improve Paste Adhesion" by Schaeffer et al, filed Jul. 2, 2001.
Ishikawa et al., "A punched grid production process for automotive batteries" from Pb 80, 7th International Conference (1980).
Perez, "The Complete Battery Book" TAB Books, Inc., 191 pp., 1985 (no month).
PCT Search Report Aug. 11, 2000 for PCT/US00/12569.
S. Goodman "Plates with improved conductivity" Batteries International, pp. 88-89 (no month).

(56) References Cited

OTHER PUBLICATIONS

Non-Final Office Action dated Nov. 19, 2003 from U.S. Appl. No. 09/755,337.
PCT International Search Report for PCT/US98/24345 (International Filing Date Mar. 3, 1999); date of mailing Mar. 11, 1999; 2 pp.
Reply and Amendment dated Feb. 12, 2004 from U.S. Appl. No. 09/755,337.
Final Office Action dated May 19, 2004 from U.S. Appl. No. 09/755,337.
Reply and Amendment dated Jul. 19, 2004 from U.S. Appl. No. 09/755,337.
Office Action dated Jan. 7, 2003 for U.S. Appl. No. 09/755,337.
Office Action dated Jun. 18, 2003 for U.S. Appl. No. 09/755,337.
Office Action dated Sep. 16, 2002 for U.S. Appl. No. 09/755,337.
U.S. Appl. No. 09/755,337 titled "Method for Making an Alloy Coated Battery Grid" by Yu-Lin Chen.
PCT Search Report dated Oct. 6, 1999 in PCT/US99/13291.
International Search Report and Written Opinion dated Oct. 5, 2006 for International Application No. PCT/US06/019686, 2 pages.
Response dated May 28, 2009 to Office Action for EPO Application No. 067707804.0-2119, 9 pages.
Office Action dated Jan. 21, 2009 for EPO Application No. 06770804.0-2119, 3 pages.
Office Action dated Apr. 23, 2008 for EPO Application No. 06770804.0-2119, 5 pages.
Response dated Oct. 28, 2008 to Office Action for EPO Application No. 06770804.0-2119, 5 pages.
Chinese Patent Office, Office Action (with English Translation) dated Jul. 6. 2009 for Chinese Patent Application No. 200680017715.1 based on PCT/US06/019686, 12 pages.
Office Action dated Sep. 30, 2009 from U.S. Appl. No. 11/984,666.
Amendment and Response dated Dec. 30, 2009 from U.S. Appl. No. 11/984,666.
Office Action dated Jan. 19, 2010 from Brazil Patent Application No. PI0206343-3 (with English Translation).
Office Action dated Aug. 5, 2009 (with English translation) for Chinese Patent Appln. No. 20060017715.1.
Response dated Sep. 23, 2009 for Chinese Patent Appln. No. 20060017715.1.
International Search Report and Written Opinion of the International Searching Authority, for International Application No. PCT/US2011/026836.
Traditional Lead Acid Battery Shortcomings, www.fireflyenergy.com.
MEGGER, Failure Modes—Lead-acid (flooded) failure modes, Battery Testing Guide, p. 7.
International Search Report and Written Opinion of the International Searching Authority dated Jul. 24, 2013 for PCT/US2012/062698.
International Search Report and Written Opinion from the International Searching Authority, dated May 26, 2009, received in connection with PCT/US08/055481 filed Feb. 29, 2008, 10 pages.

* cited by examiner

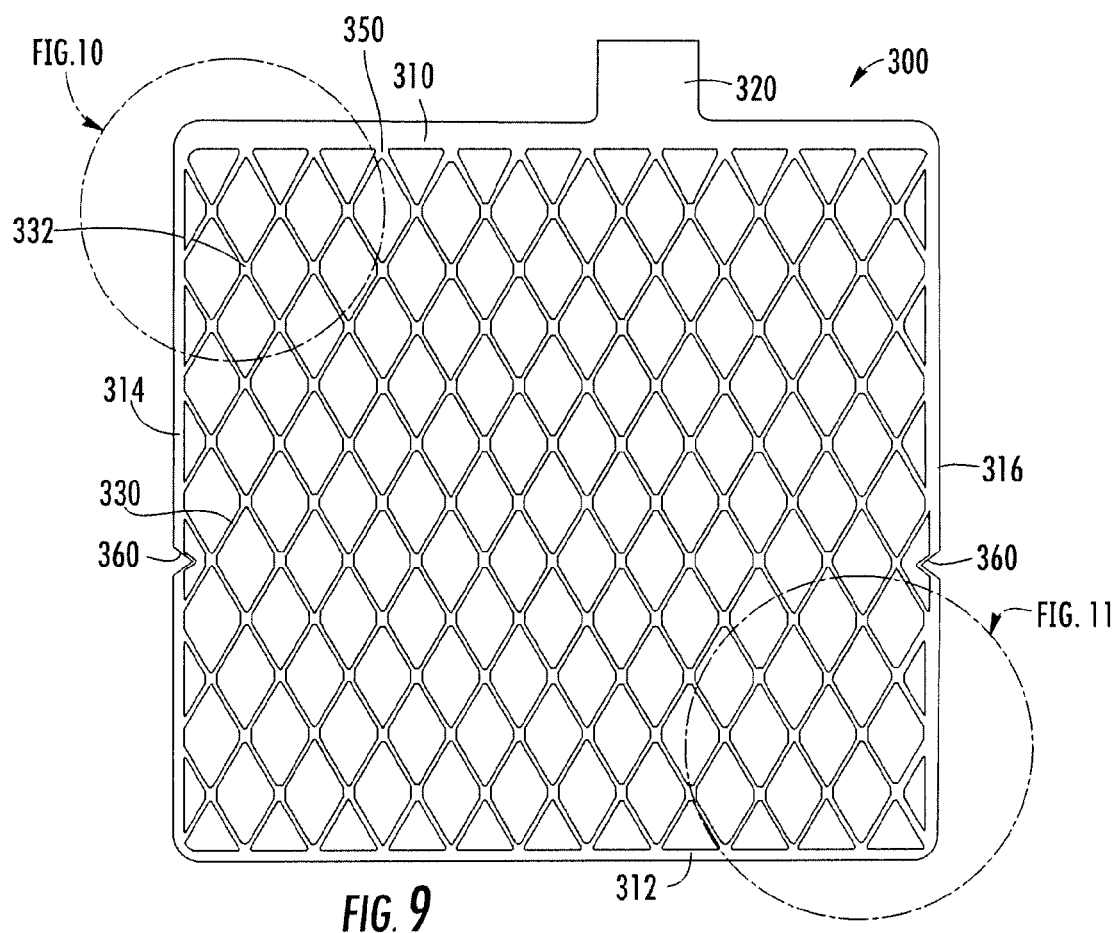
FIG. 9
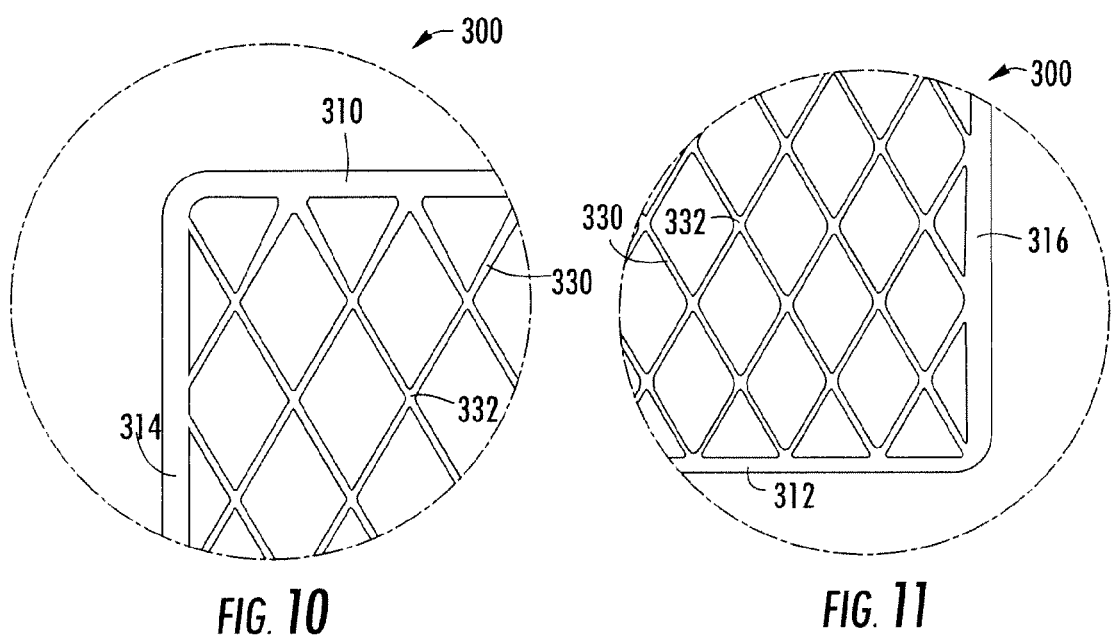
FIG. 10
FIG. 11

US 9,577,266 B2

NEGATIVE GRID FOR BATTERY

CROSS-REFERENCE TO RELATED PATENT APPLICATIONS

This application claims priority to and benefit of U.S. Provisional Application No. 60/904,404, filed Mar. 2, 2007, which is incorporated herein by reference in its entirety.

BACKGROUND

The present application relates generally to the field of batteries (e.g., lead-acid starting, lighting, and ignition batteries for vehicles such as automobiles). More particularly, the present application relates to negative grids for use in such batteries and methods for making such negative grids.

Lead-acid batteries typically include a number of cell elements which are provided in separate compartments of a container containing sulfuric acid electrolyte. Each cell element includes at least one positive plate or grid, at least one negative plate or grid, and a porous separator (e.g., a polymeric separator) positioned between each positive and negative plate. The positive and negative plates each comprise a lead or lead alloy grid that supports an electrochemically active material (referred to as a battery paste). The active material is a lead-based material (i.e., PbO, $PbO_2$, Pb or $PbSO_4$ at different charge/discharge stages of the battery) that is pasted onto the grid. The grids provide an electrical contact between the positive and negative active materials which serves to conduct current.

Conventionally, positive and negative grids are manufactured using different processes. For example, positive grids may be made using a number of different methods. One method involves the use of conventional gravity cast book mold operations. Another more recent method involves producing the grids in a continuous process in which a continuous strip of metal (e.g., a lead alloy) that has been previously cast is introduced into a die to remove material therefrom in a punching operation (e.g., using a progressive die) to form the structure of the grids. Individual wires of the grids may be deformed or "coined" to improve battery paste adhesion using a specially-adapted die. Such a process is described in greater detail in the following U.S. patents which are incorporated by reference herein in their entirety: U.S. Pat. Nos. 5,582,936; 5,989,749; 6,203,948; 6,274,274; and 6,953,641.

In contrast, negative grids are typically formed using an expanded metal process. A lead alloy strip is manufactured, either by casting (namely, cast strip) or by casting and rolling (namely, wrought strip), and the strip is subsequently slit and expanded to generate the desired grid pattern in a strip of interconnected battery grids.

It would be desirable to provide an improved method for producing negative grids for use in lead-acid batteries. It would also be desirable to provide negative grids that have features that improve their manufacturability and performance. It would be desirable to provide a grid and/or a method of producing a grid that includes any one or more of these or other advantageous features, as will be apparent to those reviewing the present disclosure.

SUMMARY

An exemplary embodiment of the invention relates to a method for producing a negative grid for a battery which includes providing a strip of battery grid material and performing a punching operation on the battery grid material to remove material and form a grid. The punching operation produces a negative battery grid having a plurality of grid wires bounded by a frame. The battery grid includes a top frame member. A first side frame member is coupled to the top frame member at a first end thereof. A second side frame member is coupled to the top frame member at a second end thereof. A bottom frame member is spaced apart from the top frame member and coupled to the first side frame member and the second side frame member. The negative grid does not include exposed wire ends that may puncture a polymeric separator when the negative grid is provided within the separator.

BRIEF DESCRIPTION OF THE DRAWINGS

FIG. 9 is a plan view of a negative battery grid according to another exemplary embodiment.

FIGS. 10-11 are detail views of portions of the grid shown in FIG. 9.

DETAILED DESCRIPTION

Figure 1:
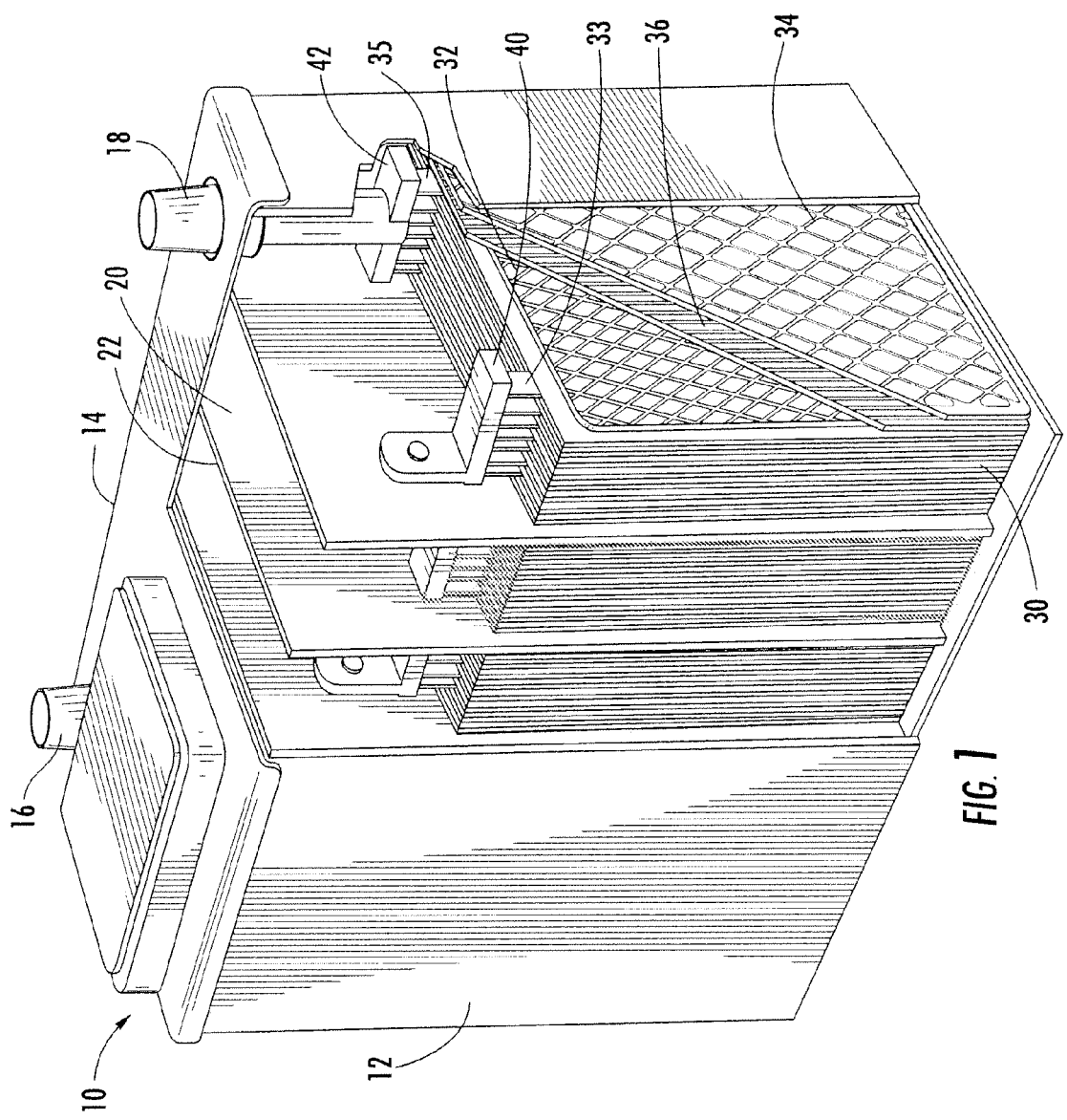
FIG. 1 is a cutaway perspective view of a battery according to an exemplary embodiment.

FIG. 1 is a cutaway perspective view of a battery 10 having a housing or container 12 and a cover or lid 14 coupled to the housing 12. Terminals or posts 16, 18 protrude from a top surface of the cover 14. According to an exemplary embodiment, terminal 16 is a positive terminal and terminal 18 is a negative terminal. According to other exemplary embodiments, terminals may be provided in other locations (e.g., positioned on a front surface of the container, as in a side-terminal battery).

The housing 12 is internally subdivided into separate spaces 20 by walls or partitions 22. Within each space 20 is provided a cell element 30 that is made up of alternating positive plates 32 (e.g., electrodes, grids) and negative plates 34 (e.g., electrodes, grids). The positive and negative plates are separated by porous polymeric separators 36 (e.g., the negative plates are provided in separator envelopes to separate them from adjacent positive plates, as shown and described in U.S. Pat. No. 6,001,503). Lugs 33 extending from the positive plates 32 are coupled to a strap 40, and lugs 35 extending from the negative plates 34 are coupled to a strap 42. The positive straps are then coupled to the positive terminal 16 and the negative straps are electrically coupled to the negative terminal 18.

Figure 2:
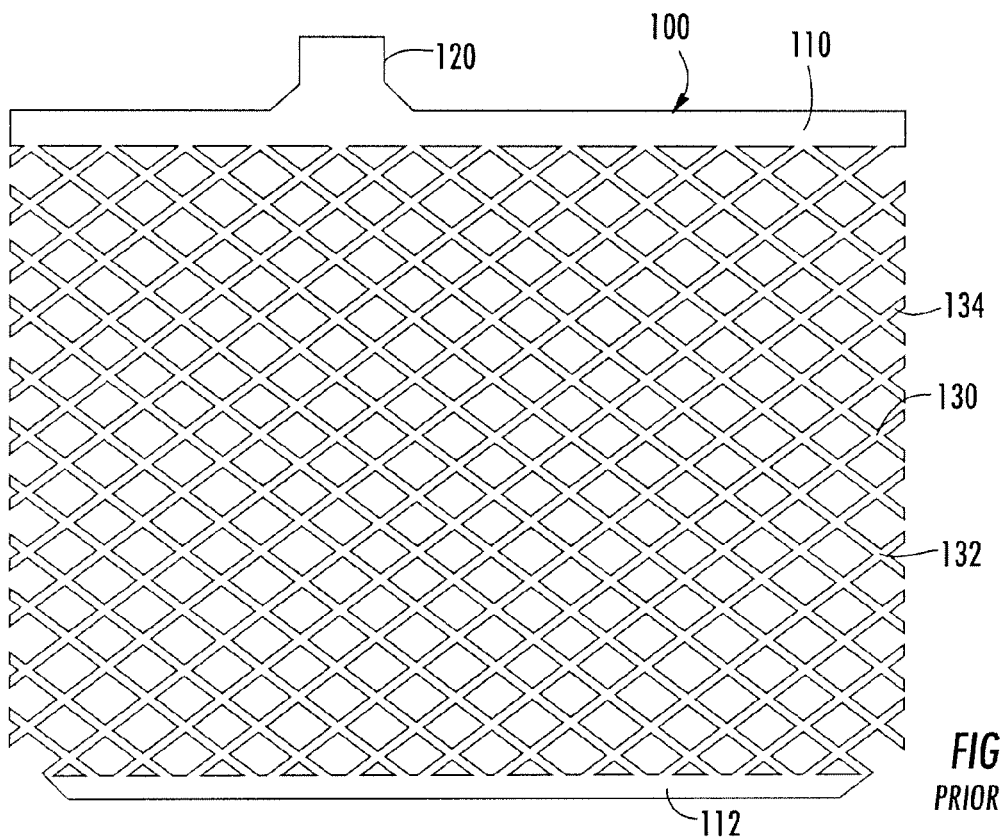
FIG. 2 is a plan view of a prior art negative battery grid for use in lead-acid batteries that was produced using an expanded metal process.

FIG. 2 illustrates a plan view of a prior art negative grid or plate 100. The grid 100 includes a top frame member or element 110 having a member 120 in the form of a current collection lug extending therefrom. The grid 100 also includes a bottom frame member or element 112. Between the top frame member 110 and the bottom frame member 112 are a plurality of interconnected wires 130 that are arranged in a diamond pattern. Nodes 132 are provided at the intersections of the wires.

Conventionally, negative grids such as that shown in FIG. 2 are manufactured in an expanded metal process in which a sheet of metal is slit at various points using knife blades and opposite ends of the sheet are pulled apart to expand the slit portion of the sheet into a plurality of grid wires. As shown in FIG. 2, the top and bottom frame elements would be pulled apart in the expansion process to form the interconnected wires. After the expansion is completed, the sheet is cut into grids, which leaves exposed wire ends (e.g., wire end 134 in FIG. 2) along the lateral sides of the grids. One difficulty with such an arrangement is that the grid wire ends along the sides of the negative grids may puncture the separator envelope such that they come into contact with a portion of an adjacent positive plate, which causes internal battery shorting and a potentially significant reduction in the useful life of the battery.

Figure 3:
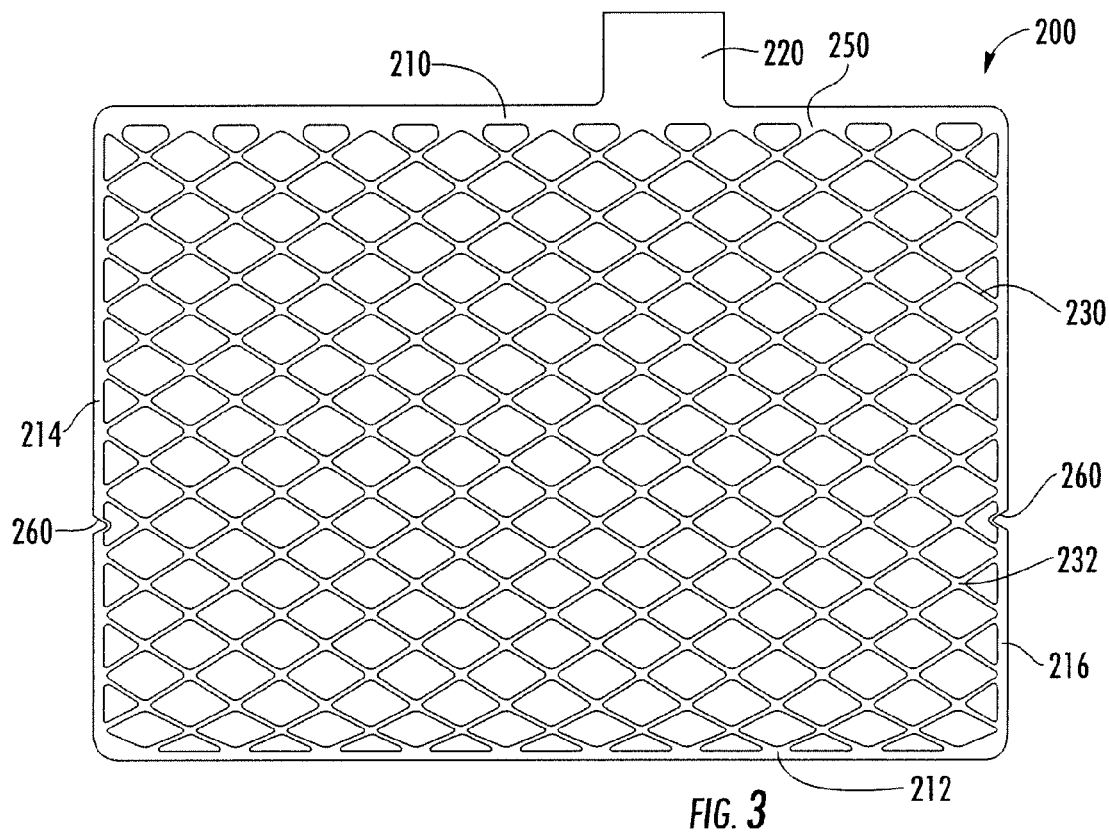
FIG. 3 is a plan view of a negative battery grid according to an exemplary embodiment.

According to an exemplary embodiment, instead of forming a grid in an expanded metal process, the grid is formed in a progressive punching operation in which a sheet of metal (e.g., a lead alloy) is run through a progressive punching die, which removes material to form the grid shape shown in FIG. 3. According to an exemplary embodiment, a conventional lead or lead alloy battery grid material (such as a lead-calcium-tin alloy) is melted and continuously cast to form a continuous strip of grid material. The continuous strip may then be rolled or wrought to modify the thickness or grain structure of the strip. A series of interconnected battery grids is then formed by punching grid material out of the continuous strip.

During the punching operation, the strip is maintained as a continuous strip and the interconnected grid shapes are formed in a progressive punching operation, (i.e., features are added to the battery grid through several punching operations). Each of the interconnected battery grids has a grid network bordered by a frame as shown in FIG. 3 and described above.

Figure 4:
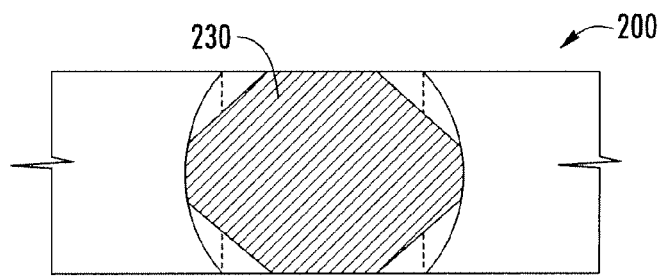
FIGS. 4-8 are cross-sectional views of grid wires according to a number of exemplary embodiments.
Figure 5:
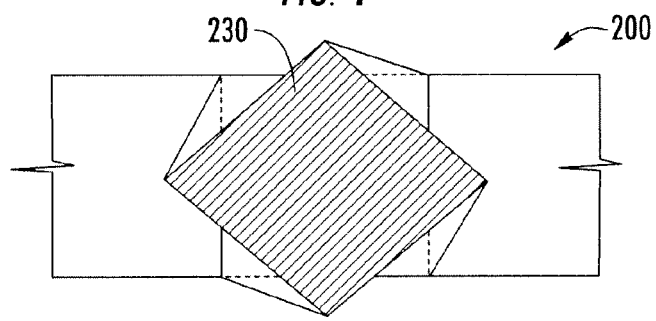
Figure 6:
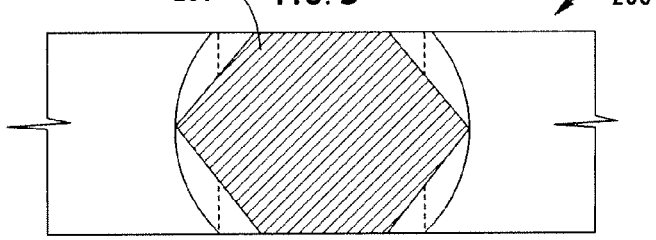
Figure 7:
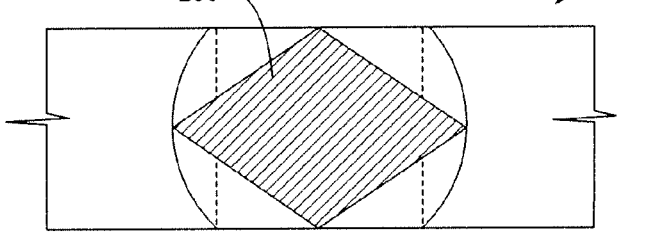

After the punching operation or process forms a strip having interconnected grids, the battery grid wire sections of the strip may optionally be processed in a stamping or coining operation or process. The stamping operation or process is used to deform or coin the grid wires so that the grid wires have a modified cross-section between the nodes, as shown in FIGS. 4-7. For instance, the stamping operation or process may include a die that deforms the rectangular cross-section of the grid wires of the punched grid into an octagonal cross-section as shown in FIG. 4. Alternatively, a stamping die may be used that rotates the intermediate portion of the grid wire elements about 20 degrees to about 70 degrees in relation to the cross-section of the opposed ends of the grid wire where the grid wire and node meet as depicted in FIG. 5. Other modifications may also be performed, as shown in FIGS. 6-7.

It should be appreciated that any number of modified grid wire shapes can be selected so as to provide improved paste adhesion characteristics for the negative grid that are superior to the rectangular cross-section produced by a stamping process. According to various exemplary embodiments, the modified grid wire substantially has a diamond shape, a rhomboid shape, a hexagon shape, an octagon shape, or an oval shape. When deforming the grid wires in the stamping station, the area of deformation along the length of the grid wire between the opposed ends of each grid wire section may vary. For example, according to an exemplary embodiment, approximately 90% of the length of the grid wire between the opposed ends of the grid wire undergoes deformation at the stamping station (e.g., approximately 5% of the grid wire length near one end of the grid wire section would have a rectangular cross-section, the center 90% of the grid wire length would have a substantially octagonal cross-section, and approximately 5% of the grid wire length near the other end of the grid wire section would have a rectangular cross-section). According to other exemplary embodiments, a different percentage of the wires may be modified.

Figure 8:
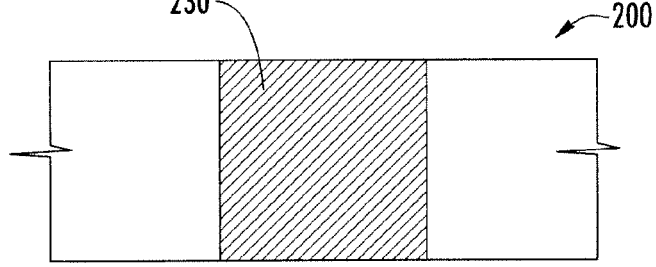

According to other exemplary embodiments, the grid wires may not be stamped or coined, and will have a cross-sectional shape as shown in FIG. 8 (e.g., an unmodified rectangular cross-section).

While it is preferred that the nodes remained undeformed, in certain circumstances it may be advantageous to deform or coin the nodes in the stamping station. Since coining of the nodes as well as the grid wires will tend to make the grid strip non-planar, pasting operations which tend to apply paste more thickly to one side of the plate than the other can benefit from this effect. The grid strip can then be oriented so that paste can more readily flow to the surface which is thinly pasted, i.e., fed into the pasting machine so that the concave side faces the direction that otherwise would be thinly pasted, typically the bottom.

It should also be noted that all or a portion of the grid may be coated with a metal alloy (e.g., a lead alloy) to provide various advantages, including, for example, improved adhesion of battery paste. Examples of such coatings are described in U.S. Pat. No. 6,953,641, the entire disclosure of which is incorporated by reference herein.

The interconnected grids are then processed to apply battery paste and the strip is cut to form a plurality of battery plates. Alternatively, the interconnected grids may be cut into a plurality of grids before pasting and stored for later use. One advantageous feature of using a grid such as that described herein in place of expanded metal grids is that while expanded metal grids cannot be pasted with a fixed orifice paster (due to interference of the off-plane twisting wires), stamped grids are not so restricted.

According to an exemplary embodiment, the negative grid 200 has an unpasted thickness of between approximately 0.010 and 0.050 inches. Conventional negative grids produced in an expanded metal process have a strip thickness of between approximately 0.022 inches and 0.035 inches, and an expanded mesh thickness of between approximately 0.030 inches and 0.045 inches. One advantageous feature of providing a battery that uses thinner negative grids is that batteries using such grids may exhibit higher energy density, since less space will be taken up by each negative grid (e.g., additional grids may be added to the battery or the battery may be made smaller).

Referring to FIG. 3, an improved negative grid 200 is shown according to an exemplary embodiment. The grid 200 includes a top frame member or element 210 (having a current collection lug 220 extending therefrom), a bottom frame member or element 212, a first side frame member or element 214, and a second side frame member or element 216. Side frame members 214, 216 are coupled to opposite ends of top frame member 210 and bottom frame member 212 to form an enclosed area in the approximate shape of a rectangle. A plurality of grid wires 230 are arranged in a diamond pattern that intersect at nodes 232.

Still referring to FIG. 3, the grid wires 230 are coupled to the top frame member 210 at a plurality of intersection points (e.g., where the grid wires 230 intersect the top frame member 210). These intersection points may have features 250 to aid the conductivity interface between the grid wires 230 and the top frame member 210. The conductivity enhancing features allow the relatively thin grid wires 230 to be coupled to the top frame member 210 in a materially efficient manner (i.e. use as little material as possible) and still provide a strong connection between the grid wires 230 and the top frame member 210. As can be seen in FIG. 3, the grid wires become gradually wider as the grid wires 230 approach the top frame member 210. In addition to the gradually widening of the grid wires 230 as they approach the top frame member 210, the intersection points are curved on either side of the intersection point. The curves or radii are only possible through the use of a punching operation and cannot be obtained in an expanded metal process. The side and bottom frame members 212, 214, 216 may also have similar features at the intersection points where the grid wires 230 are coupled to the side and bottom frame members 212, 214, 216.

Still referring to FIG. 3, the side, top and/or bottom frame members 210, 212, 214, 216 may include one or more features 260 (e.g., cutouts, notches, depressions, etc.) to aid in controlling and/or compensating for grid growth during use of the grid in a battery (see, e.g., FIG. 3, illustrating cutouts formed in the side frame members 214, 216). The feature 260 provides a localized weakened area so that if grid 200 should grow during use, the feature 260 will break and limit and/or control grid growth. According to other exemplary embodiments, features to restrict or control grid growth such as those shown and described in U.S. patent application Ser. No. 11/984,666 (the entire disclosure of which is incorporated herein by reference) may be incorporated in the grids described herein.

One advantageous feature of the exemplary embodiment shown in FIG. 3 is that because the frame elements 210, 212, 214, and 216 form a border or frame around the entire outer periphery of the grid 200, there are no exposed wire ends that may puncture a battery separator and cause internal battery shorting. This in turn may help to extend the life of the battery (e.g., preventing short circuits, etc.).

It should be noted that while FIG. 3 illustrates a negative grid 200 according to an exemplary embodiment, other configurations are possible. FIGS. 9-13 illustrate other possible configurations according to other exemplary embodiments (reference numerals in FIGS. 9-13 are similar to those in FIG. 3). Various features described above (e.g., features to aid in conductivity; cutouts or notches to aid in controlling and/or compensating for grid growth; stamping to deform wire cross-sections, coating all or a portion of the grid with an alloy such as a lead alloy, etc.) may also optionally be used with the embodiments shown in FIGS. 9-13.

For example, in FIGS. 9-11, a grid 300 is illustrated in which the diamond pattern of the grid wires is more elongated than that shown in FIG. 3 (e.g., the diamond pattern does not form substantially square openings between the intersecting wires). This type of elongated diamond pattern cannot be made using an expanded metal process. The top, sides and/or bottom frame elements or members may include features (e.g., gradually widening grid wires near the intersection points with the frame members, etc.) to aid the conductivity interface between the grid wires and the frame members (see, e.g., FIG. 9, illustrating the features 350 formed between the grid wires 330 and the top frame member 310). Features 350 may occur at every intersection point between the grid wires and the frame members (see, e.g., FIG. 9, illustrating the features 350), or only in certain intersection points (e.g., only on the left side of the intersection points that are to the left of lug 320 and only on the right side of the intersection points that are to the right of lug 320). In addition, the side, top and/or bottom frame elements or members may also include features (e.g., cutouts, growth limiting devices, etc.) to aid in controlling and/or compensating for grid growth during use of the grids (see, e.g., FIG. 9, illustrating features 360 formed in the side frame elements 314, 316).

Figure 12:
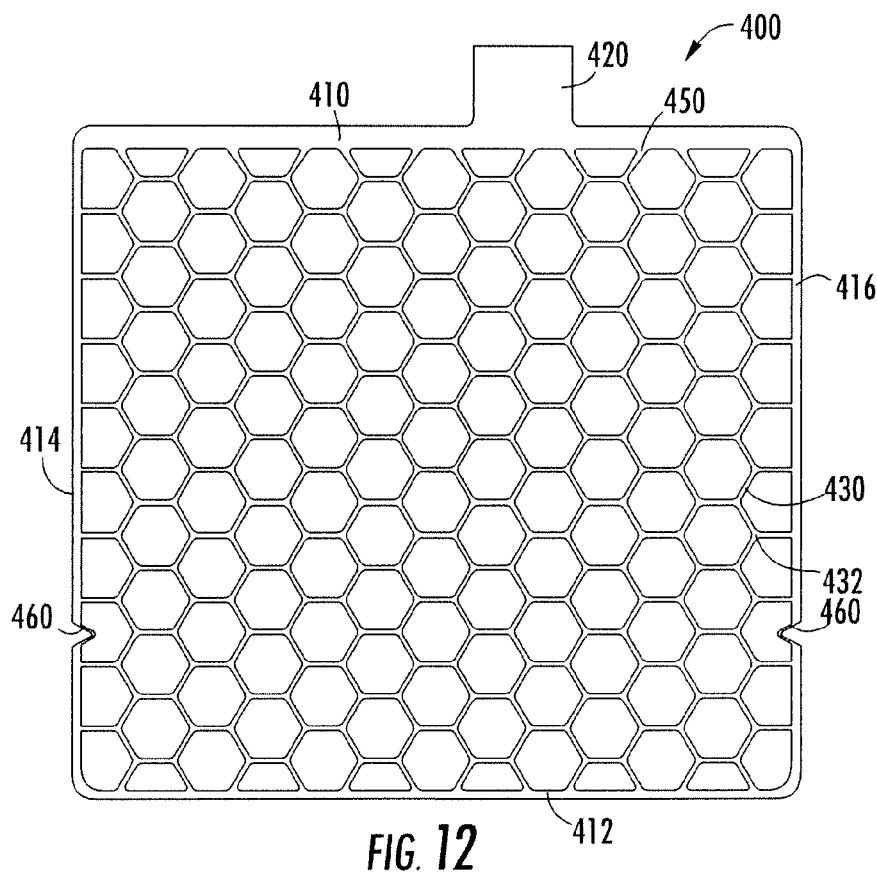
FIG. 12 is a plan view of a negative grid according to another exemplary embodiment.

FIG. 12 illustrates an exemplary embodiment of a grid 400 in which the wires are arranged to form generally hexagon-shaped openings between the wires (e.g., a "honeycomb" configuration is obtained). The top, sides and/or bottom frame elements or members may include features (e.g., gradually widening grid wires near the intersection points with the frame members, etc.) to aid the conductivity interface between the grid wires and the frame members (see, e.g., FIG. 12, illustrating the features 450 formed between the grid wires 430 and the top frame member 410). Features 450 may occur at every intersection point between the grid wires and the frame members, or only in certain intersection points. In addition, the side, top and/or bottom frame elements or members may also include features (e.g., cutouts, growth limiting devices, etc.) to aid in controlling and/or compensating for grid growth during use of the grids (see, e.g., FIG. 12, illustrating features 460 formed in the side frame elements 414, 416). One advantageous feature of the design shown in FIG. 12 is that each of the nodes 432 have three wires coming into the node, as opposed to, for example, the design shown in FIG. 9, in which each of the nodes 332 have four wires coming into it. One benefit of such a configuration is that less material is used at the node.

Figure 13:
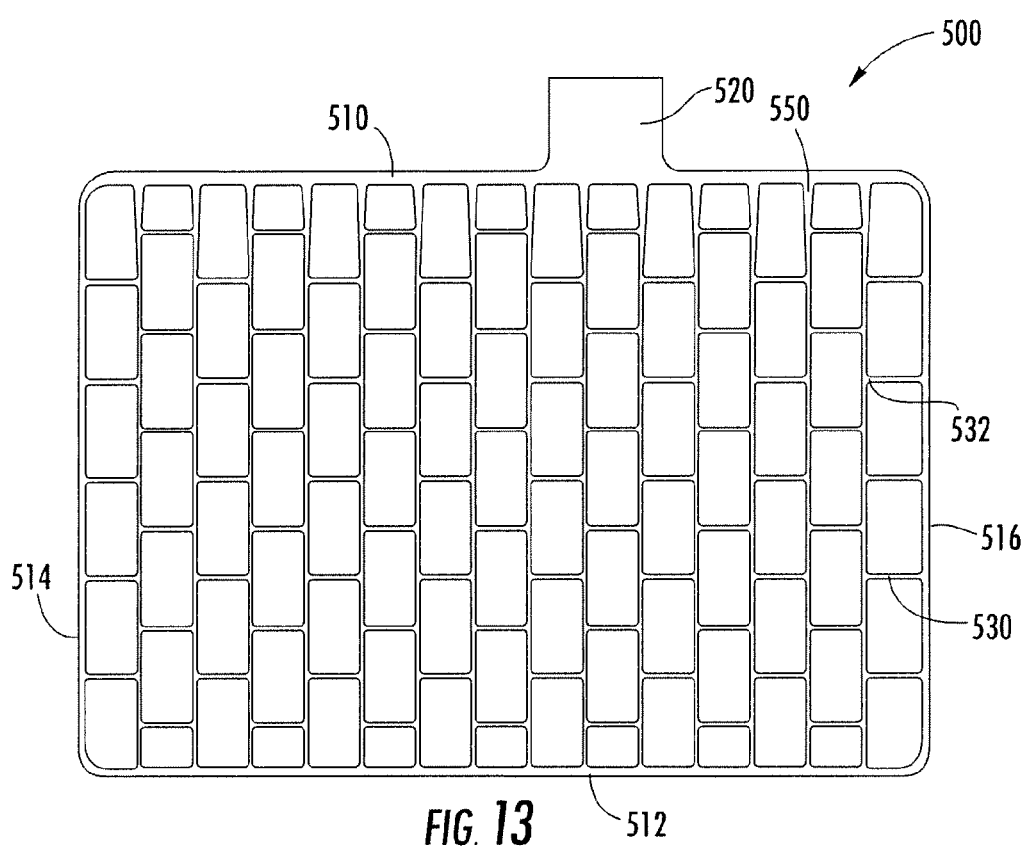
FIG. 13 is a plan view of a negative grid according to another exemplary embodiment.

FIG. 13 illustrates an exemplary embodiment of a grid 500 in which the wires are arranged to form generally rectangular-shaped openings between the wires. Vertical wires run continuously between a top or upper frame element 510 and a bottom or lower frame element 512, while the horizontal wires extend between adjacent vertical wires such that they do not run continuously from left to right across the grid between side frame elements 514 and 516. According to the exemplary embodiment shown in FIG. 13, each of the complete rectangular openings is substantially the same size (the partial rectangular openings have different sizes, depending on where they are located in the grid). According to other exemplary embodiments, the complete rectangular openings may have different sizes. The top, sides and/or bottom frame elements or members may include features (e.g., gradually widening grid wires near the intersection points with the frame members, etc.) to aid the conductivity interface between the grid wires and the frame members (see, e.g., FIG. 13, illustrating the features 550 formed between the grid wires 530 and the top frame member 510). Features 550 may occur at every intersection point between the grid wires 530 and the frame members, or only in certain intersection points. The side, top and/or bottom frame elements may include features (not shown) to aid in controlling and/or compensating for grid growth during use of the grids.

According to an exemplary embodiment, a battery may be produced using both positive and negative plates or grids that are formed in a stamping and/or coining process.

According to an exemplary embodiment, the negative grid according to any of the exemplary embodiments described herein is made from a lead alloy that includes the composition shown in Table 1.

TABLE 1

| Element | Range of Percentages |
|---|---|
| Calcium | 0.05 to 0.50% |
| Antimony | 0.001 to 2.5% |

TABLE 1-continued

| Element | Range of Percentages |
| --- | --- |
| Tin | 0.01 to 2.0% |
| Copper | 0.001 to 0.1% |
| Arsenic | 0.001 to 0.25% |
| Bismuth | 0.01 to 0.05% |
| Silver | 0.003 to 0.01% |
| Lead | balance |

According to another exemplary embodiment, the negative grid according to any of the exemplary embodiments described herein is made from a lead alloy that includes the composition shown in Table 2.

TABLE 2

| Element | Range of Percentages |
| --- | --- |
| Calcium | 0.05 to 0.15% |
| Antimony | <0.002% |
| Tin | >0.5% |
| Copper | <0.005% |
| Arsenic | <0.002% |
| Bismuth | <0.02% |
| Silver | <0.005% |
| Lead | balance |

One advantageous feature of forming negative grids in the manner described above is that such grids require less material than grids manufactured in an expanded metal process. As a result, weight and material cost savings may be realized in using grids such as those described above.

It is important to note that the construction and arrangement of the battery grid as shown in the various exemplary embodiments is illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed herein. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present invention.

What is claimed is:

1. A method for producing a negative grid for a battery comprising:

providing a strip of battery grid material;

performing a punching operation on the battery grid material to remove material and form the negative battery grid;

whereby the negative battery grid has a plurality of grid wires joined at a plurality of nodes and formed by the punching operation into a uniform pattern of grid wires bounded by a frame comprising:

a top frame member;

a first side frame member coupled to the top frame member at a first end thereof;

a second side frame member coupled to the top frame member at a second end thereof;

a bottom frame member spaced apart from the top frame member and coupled to the first side frame member and the second side frame member;

wherein each of the grid wires coupled to the top frame member is joined to the top frame member at an intersection point having a conductivity enhancing feature configured to aid conductivity between the plurality of grid wires and the frame;

wherein the conductivity enhancing feature of each grid wire is formed by a gradual widening of grid wire beginning from a node immediately adjacent to the top frame member toward the intersection point wherein the remainder of the grid wire not having a conductivity enhancing feature has a substantially constant thickness;

and wherein the negative grid is free of exposed wire ends for preventing puncturing of a polymeric separator when the negative grid is provided within the separator.

2. The method of claim 1 wherein the punching operation is a progressive punching operation.

3. The method of claim 1 wherein the battery grid material is a continuously cast lead alloy strip that is processed to modify at least one of the thickness and grain structure of the continuously cast lead alloy strip.

4. The method of claim 3 wherein the negative battery grid has a thickness in the range of about 0.010 to 0.050 inches.

5. The method of claim 3 wherein a series of interconnected battery grids are formed by punching the grid material out of the continuously cast lead alloy strip.

6. The method of claim 1 wherein the plurality of grid wires are arranged in a honeycomb shape.

7. The method of claim 6 wherein the honeycomb shape comprises regular hexagons.

8. The method of claim 1 wherein at least one of the top frame member, first side frame member, second side frame member, and bottom frame member is provided with a feature which compensates for grid growth during use of the grid.

9. The method of claim 1 wherein the plurality of grid wires comprise vertical grid wires spanning from the top frame member to the bottom frame member and horizontal grid wires perpendicular to the vertical grid wires.

10. The method of claim 8 wherein the battery grid is subjected to a coining step to deform at least one of the plurality of grid wires and the plurality of nodes.

11. The method of claim 10 wherein a grid wire from the plurality of grid wires is deformed to produce a cross-section that has a shape selected from a group consisting of an octagon shape, a diamond shape, a rhomboid shape, a hexagon shape, and an oval shape.

12. The method of claim 1 wherein the negative battery grid is coated with a lead alloy.

13. The method of claim 1 wherein the negative battery grid is formed into a battery plate further comprising using a fixed orifice paster to coat the negative battery grid with an active material.

14. The method of claim 1 wherein the battery grid material has a composition of 0.05 to 0.50 percent calcium, 0.001 to 2.5 percent antimony, 0.01 to 2.0 percent tin, 0.001 to 0.1 percent copper, 0.001 to 0.25 percent arsenic, 0.01 to 0.05 percent bismuth, 0.003 to 0.01 percent silver, and a balance of lead.

15. The method of claim 1 wherein the battery grid material has a composition that comprises 0.05 to 0.15 percent calcium, less than 0.002 percent antimony, greater than 0.5 percent tin, less than 0.005 percent copper, less than 0.002 percent arsenic, less than 0.02 percent bismuth, less than 0.005 percent silver, and a balance of lead.

16. A negative battery grid comprising:
a frame comprising a top element, a bottom element, a first side element, and a second side element;
a plurality of stamped grid wires forming a uniform pattern of wires provided within the frame and defining a plurality of open areas, wherein the plurality of grid wires join at a plurality of nodes, wherein each of the grid wires coupled to the top frame element is joined to the top frame element at an intersection point having a conductivity enhancing feature configured to aid conductivity between the plurality of grid wires and the frame, wherein the conductivity enhancing feature is formed by a gradual widening of grid wire beginning from each node immediately adjacent to the top frame element toward the intersection point and wherein a remainder of the grid wire not having a conductivity enhancing feature has a substantially constant thickness; and
a current collection lug extending from the top element in a first direction.

17. The negative battery grid of claim 16, wherein the intersection points have a radius between the frame element and the grid wire to enhance the electrical conductivity between the frame element and the plurality of grid wires.

18. The negative battery grid of claim 16, further comprising at least one growth reduction feature provided in the battery grid that is configured to compensate for grid growth during use.

19. The negative battery grid of claim 16, wherein the negative battery grid has an unpasted thickness ranging from 0.010 to 0.021 inches.

20. The negative battery grid of claim 16 wherein the plurality of grid wires are arranged in a regular pattern across the grid consisting of a diamond shape which is either vertically or horizontally elongated.

21. The negative battery grid of claim 16 wherein at least one of the top frame element, first side frame element, second side frame element, and bottom frame element is provided with a feature which compensates for grid growth during use of the grid.

22. The negative battery grid of claim 16 wherein the negative battery grid is coated with a lead alloy.

23. The negative battery grid of claim 16 wherein the battery grid material has a composition of 0.05 to 0.50 percent calcium, 0.001 to 2.5 percent antimony, 0.01 to 2.0 percent tin, 0.001 to 0.1 percent copper, 0.001 to 0.25 percent arsenic, 0.01 to 0.05 percent bismuth, 0.003 to 0.01 percent silver, and a balance of lead.

24. The negative battery grid of claim 16 wherein the battery grid material has a composition that comprises 0.05 to 0.15 percent calcium, less than 0.002 percent antimony, greater than 0.5 percent tin, less than 0.005 percent copper, less than 0.002 percent arsenic, less than 0.02 percent bismuth, less than 0.005 percent silver, and a balance of lead.

25. The negative battery grid of claim 16 wherein the nodes immediately adjacent to one or more of the first, second, and bottom frame elements are provided with an additional conductivity enhancing feature, and wherein the additional conductivity enhancing feature is formed by a gradual widening of grid wire beginning from each node immediately adjacent to the one or more frame elements toward an intersection point with the one or more frame elements.

26. A punched negative battery grid comprising:
a frame having frame members comprising a top element, a bottom element, a first side element, and a second side element;
a plurality of punched grid wires joined at a plurality of nodes forming a pattern of wires provided within the frame and defining a plurality of open areas, wherein each grid wire coupled to a single frame members of the frame members is joined to the single frame member at an intersection point having a feature provided between the plurality of grid wires and the single frame member, wherein the feature is formed by a gradual widening of the grid wire beginning from a node immediately adjacent to the single frame member toward the intersection point and wherein the remainder of the grid wire not having the feature has a substantially constant thickness; and
a current collection lug extending from the top element in a first direction.

27. The negative battery grid of claim 26 wherein one or more grid wires of the plurality of grid wires is coupled to the top element and the feature is provided between one or more nodes immediately adjacent to the top element and an intersection point with the top element.

28. The negative battery grid of claim 26 wherein the intersection point is curved on either side of the intersection point.

29. The negative battery grid of claim 26 wherein the substantially constant thickness is the same across the plurality of grid wires.

30. The negative battery grid of claim 26 further comprising at least one growth reduction feature provided in the battery grid that is configured to compensate for grid growth during use.

31. The negative battery grid of claim 26 wherein the plurality of grid wires are arranged in a honeycomb shape.

* * * * *